(12) United States Patent
Hirano et al.

(10) Patent No.: US 6,658,501 B1
(45) Date of Patent: Dec. 2, 2003

(54) PRINTER DEVICE HAVING A FUNCTION OF PREVENTING MALFUNCTIONS OWING TO AN ABNORMAL SIGNAL LEAKING OUT FROM AN EXTERNAL RECORDING DEVICE

(75) Inventors: Takashi Hirano, Takatsuki (JP); Yoshitaka Kataoka, Higashiosaka (JP)

(73) Assignees: Funai Electronic Co., Ltd., Osaka (JP); Funai Techno-Systems Co., Osaka (JP)

( * ) Notice: Subject to any disclaimer, the term of this patent is extended or adjusted under 35 U.S.C. 154(b) by 0 days.

(21) Appl. No.: 09/471,449

(22) Filed: Dec. 23, 1999

(30) Foreign Application Priority Data

Jan. 7, 1999 (JP) ............................................ 11-000034

(51) Int. Cl.[7] ........................... G06F 13/14; G06F 13/20
(52) U.S. Cl. ............................... 710/15; 710/5; 710/16; 710/18; 710/19; 714/49
(58) Field of Search ............................... 710/5, 15, 16, 710/18, 19; 714/49

(56) References Cited

U.S. PATENT DOCUMENTS

| | | | | |
|---|---|---|---|---|
| 4,325,119 A | * | 4/1982 | Grandmaison et al. | 710/5 |
| 4,989,172 A | * | 1/1991 | Criswell | 708/530 |
| 5,202,964 A | * | 4/1993 | Crouch | 710/19 |
| 5,459,857 A | * | 10/1995 | Ludlam et al. | 714/6 |
| 6,237,028 B1 | * | 5/2001 | Jackson | 709/210 |

FOREIGN PATENT DOCUMENTS

| | | | | |
|---|---|---|---|---|
| JP | 4-170627 | | 6/1992 | |
| JP | 6-15884 | | 1/1994 | |
| JP | 406164776 A | * | 6/1994 | H04N/1/00 |
| JP | 8-63300 | | 3/1996 | |
| JP | 9-24659 | | 1/1997 | |

* cited by examiner

Primary Examiner—Rehana Perveen
(74) Attorney, Agent, or Firm—Jordan and Hamburg LLP

(57) ABSTRACT

In a printer that is connected to a host personal computer via an external recording device through parallel interfaces, a signal that has been received from the host personal computer is detected by an ASIC at specified sampling cycles and to allow an interrupt in case it is detected that this signal is a signal for instructing start of communication; in case the interrupt has been made while printing actions are being executed, a CPU notifies the host personal computer of a busy condition; in case no response is given from the host personal computer, the signal for instructing start of communication is invalidated. With this arrangement, it is made possible to accurately detect whether a received signal is correct or not and malfunctions owing to incorrect signals leaking out from the external recording device to the printer can be prevented.

4 Claims, 2 Drawing Sheets

Dashed line: Flow of signal from PC to Zip
Solid line: Flow of signal from PC to Printer Dashed line: Flow of signal from PC to Zip
Solid line: Flow of signal from PC to Printer

PRINTER DEVICE HAVING A FUNCTION OF PREVENTING MALFUNCTIONS OWING TO AN ABNORMAL SIGNAL LEAKING OUT FROM AN EXTERNAL RECORDING DEVICE

FIELD OF THE INVENTION

The present invention relates to a printer device, and more particularly to a technique related to signal processing in a printer device that is connected to a data processing device via an external recording device through parallel interfaces provided with specified control signal cables.

It is a conventionally known technique to connect a printer device to a data processing device via an external recording device through parallel interfaces provided with specified control signal cables wherein the printer device receives printing data from the data processing device for enabling printing in this condition. In such a case, it is made possible to control actions of the external recording device through the data processing device even though the printer device is executing printing. Further, detection of types of received signals is performed in the printer device in that the control means (namely a CPU) governing control of the entire device performs confirmation of conditions of signals at specified intervals. It is also suggested for an error notification mechanism in a printer device for notifying the data processing device (namely a host personal computer) of errors on side of the printer device by utilizing parallel interfaces (see, for instance, Japanese Patent Application Laid-Open Publication No. 8-63300 (1996)).

SUMMARY OF THE INVENTION

However, it is the case with such a printer device that is connected to a data processing device via an external recording device as explained above that in case the external recording device is actuated by the data processing device when the printer device is executing printing, the external recording device outputs, upon access between the data processing device and the external recording device, a signal to the printer device that is identical to a signal for instructing start of communication (for instance, signal identical to Event 1 of IEEE 1284 standard). When the control means of the printer device receives this signal, processes for starting communication with the data processing device are performed so as to assume a condition in which printing data can be received from the data processing device even though preparations for receiving the printing data are not finished yet so that printing data may be lost. For detecting received signals in the printing device, intervals for confirming signals cannot be made shorter in view of limited processing performance of the control means, it could not be accurately detected whether signals are correct or not. For instance, in case confirmation of signals could only be performed by the control means at every 2 ms (milliseconds), it could not be determined whether the condition of the signal was persistent during a period starting from a point at which the signal was first confirmed up to a point at which a signal was confirmed after 2 ms, or whether the signal at a point that a signal is first confirmed is different from a signal at a point that a signal is confirmed after 2 ms.

The present invention has been made for solving the above problems, and it is an object thereof to provide a printer device that is connected to a data processing device via an external recording device through parallel interfaces provided with specified control signal cables wherein malfunctions owing to signals leaking out from the external recording device to the printer device can be prevented to maintain execution of normal printing actions and wherein correctness or incorrectness of received signals can be accurately detected.

According to one aspect of the present invention, in case the printer device has received a signal for instructing start of communication when printing actions are being executed, processes are performed in correspondence thereto for sending a signal to the data processing device indicating that the printer device is in a busy condition so that no condition capable of receiving signals is assumed in accordance with the signal for instructing start of communication but the printing actions that are being performed at that time are continued. Further, in case the signal indicating a busy condition is sent from the printer device to the data processing device and the data processing device is intentionally outputting the signal for instructing start of communication, a signal corresponding to the signal indicating a busy condition is output to the printer device whereupon the printer device performs normal actions in accordance with this signal. In case the data processing device is not intentionally outputting the signal for instructing start of communication, that is, in case an incorrect signal for instructing start of communication is sent from the external recording device to the printer device, the data processing device ignores the signal for indicating a busy condition and gives no response to the printer device so that the printer device considers the signal for instructing start of communication to be invalid and continues the printing actions that are being performed at that time are continued.

According to another aspect of the present invention, detection of a signal that has been received from the data processing device is performed by the second control means without depending on the processing performance of the control means, so that signal detection can be performed at shorter sampling cycles than compared to a case in which the control means performs detection of signals. By the arrangement of enabling detection of signals at short sampling cycles, it can be more accurately detected whether the received signal is a signal for instructing start of communication or not and malfunctions can be reliably prevented.

According to further aspect of the present invention, detection of a correct signal is performed by the second control means whereby malfunctions of the printer device that are based on incorrect signals can be prevented. Even though an interrupt has been allowed through the received signal, in case the allowance for the interrupt has been given when printing actions are being executed, processes are accordingly performed for sending a signal indicating that the printer device is in a busy condition to the data processing device so that printing actions that are being performed at that time are continued. Thus, it can be prevented that the printer device performs malfunctions in case the data processing device is not intentionally outputting a signal for instructing start of communication.

PREFERRED EMBODIMENTS OF THE INVENTION

Figure 1:
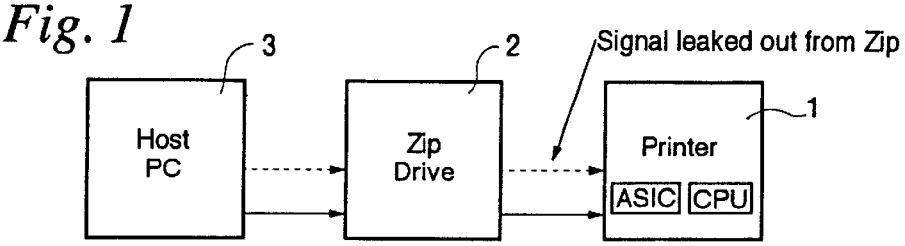
FIG. 1 is a view showing connected conditions between a printer device according to one embodiment of the present invention, a Zip drive and a host personal computer.

The printer device according to an embodiment of the present invention will now be explained with reference to the drawings. FIG. 1 is a view showing a connected condition of the printer device according to an embodiment of the present invention to a Zip drive (external recording device) and host personal computer (data processing device). The printer (printer device) 1 is indirectly connected to the host personal computer 3 via the external recording device comprised of the Zip drive 2 or the like. These apparatuses are mutually connected by parallel interfaces provided with specified control signal cables. Thus, for outputting signals from the host personal computer 3 to the printer 1, all of the signals are sent to the printer 1 by passing through parallel ports of the Zip drive 2 and no signals are directly output to the printer 1.

Figure 2:
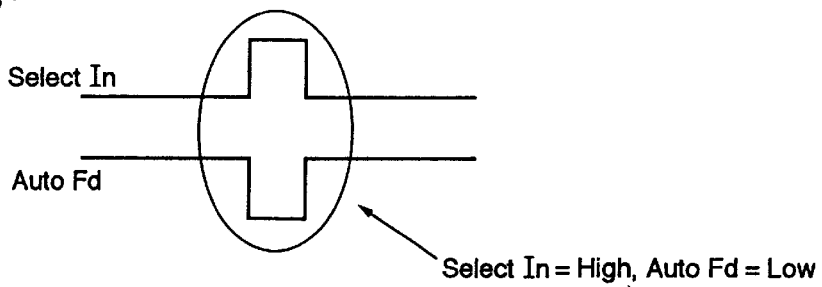
FIG. 2 is a view showing an Event 1 signal of IEEE 1284 standard.

A signal pattern of a signal for instructing start of communication that is output from the host personal computer 3 to the printer 1 will now be explained with reference to FIG. 2. In the printer 1, the signal that is output from the host personal computer 3 to the printer 1 is an Event 1 signal of IEEE 1284 standard. As shown in FIG. 2, this signal is a combination of a Select In signal and an Auto Fd signal and is output to the printer 1 in a condition in which timings of a high section of the Select In signal and a low section of the Auto Fd signal are matched.

Figure 3:
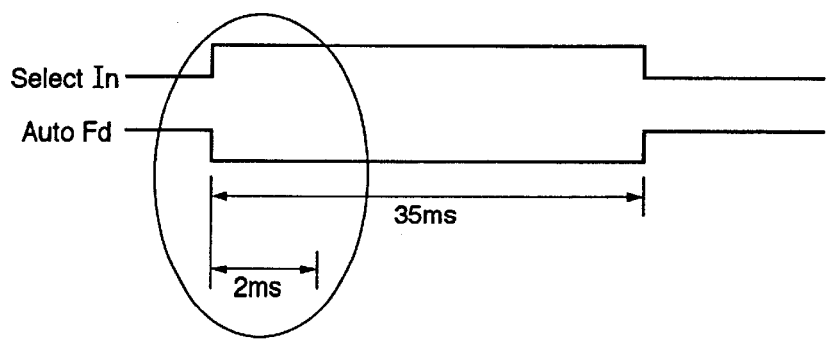
FIG. 3 is a view showing a pattern of a normal signal that is output from the host personal computer to the printer.
Figure 4:
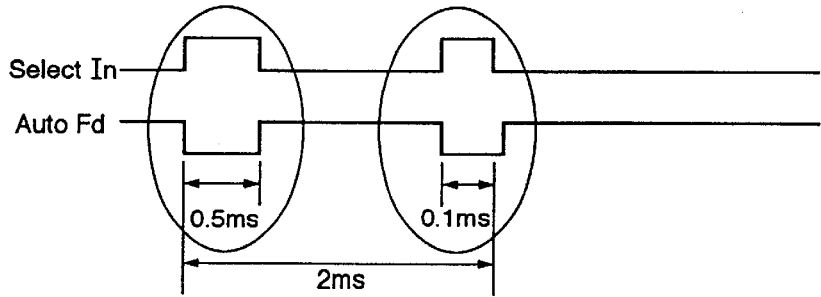
FIG. 4 is a view showing a pattern of an abnormal signal that is output from the host personal computer to the printer.
Figure 5:
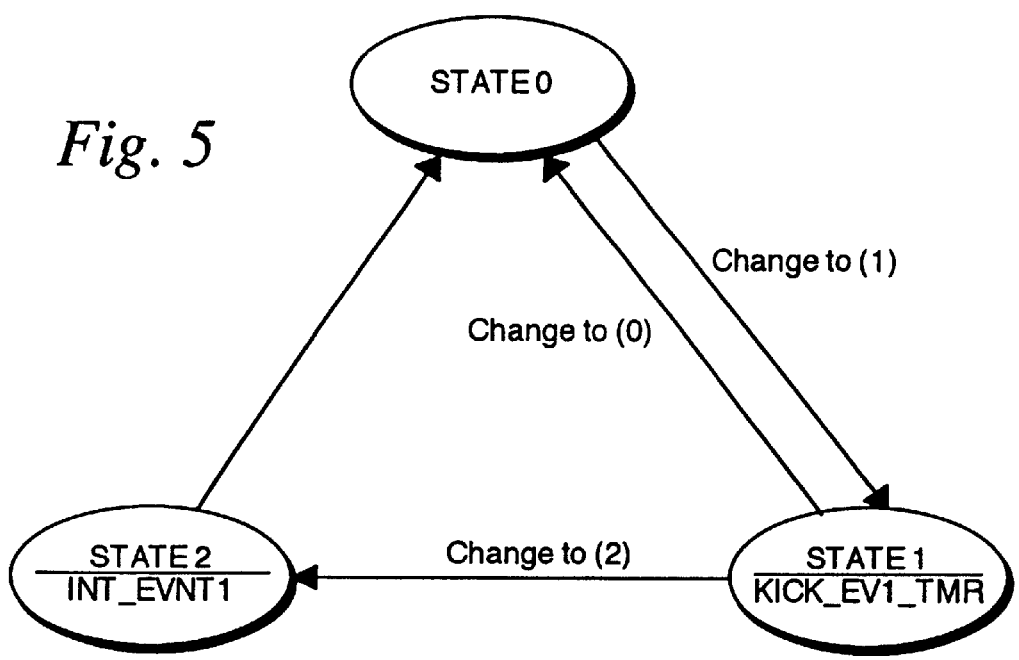
FIG. 5 is a view showing changes in conditions of a control unit of the printer (ASIC) at the time of detecting a received signal.

Methods for detecting whether the signal that has been received by the printer device 1 is a normal signal or not will now be explained with reference to FIGS. 3 to 5. FIG. 3 shows a pattern of a normal signal that is output from the host personal computer 3 to the printer 1, FIG. 4 shows a pattern of an abnormal signal, and FIG. 5 shows changes in conditions of the control unit of the printer 1 at the time of detection. In the printer 1, detection of the signal is performed not by a CPU (control means) for controlling actions of the printer 1 but by an ASIC (second control means) for supporting the CPU. A normal signal pattern that is sent to the printer 1 is assumed to be a signal in which the high section of the Select In signal and the low section of the Auto Fd signal continue for 35 ms (FIG. 3). In case the ASIC is in a condition in which it receives no signals (State 0 in FIG. 5), when it receives a signal and it is detected that the Select In signal is high and the Auto Fd signal is low, a timer for counting 2 ms is started from that point on, and during this period, it is observed whether the conditions of the Select In signal and Auto Fd signal are not changed (the condition is changed to State 1 in FIG. 5). In case the conditions for the Select In signal being high and the Auto Fd signal being low have varied in the course of this observation, the timer is cleared and the condition is returned to State 0. In case the timer has expired and the conditions for the Select In signal being high and the Auto Fd signal being low are still persisting, the signal that is subjected to detection is determined to be normal so that an interrupt is generated based on this signal (the condition is changed to State 2).

Since the printer 1 of the above arrangement performs detection of a signal by using the ASIC, the signal can be confirmed at shorter intervals than compared to a case in which the CPU is used (that is, more frequently than compared to cases in which the CPU is used) during observations for 2 ms. In case signals are detected by the CPU, it may happen that signals can be confirmed only twice, at the time of starting the timer and at the time of terminating the timer, that is, at 2 ms intervals only owing to limits in processing performance of the CPU. In such a case, even though an abnormal signal pattern as shown in FIG. 4 is received wherein the signal waves are normal at the time of starting the timer and at the time of terminating the timer, it could not be detected that the signal is abnormal. However, according to the printer 1 of the present embodiment, it has been enabled to also detect an abnormal signal pattern as shown in FIG. 4.

Figure 6:
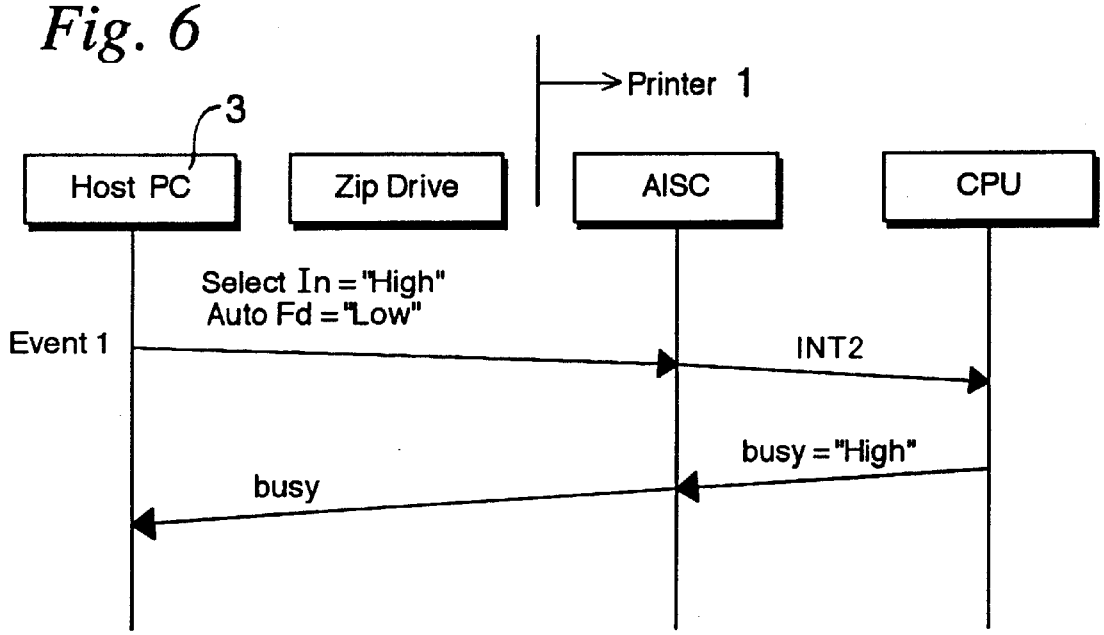
FIG. 6 is a view showing input and output of signals between the host personal computer and the printer at the time the printer has received a signal instructing start of communication.

Processes that are performed when the printer 1 receives a signal for instructing start of communication will now be explained with reference to FIG. 6. FIG. 6 shows input and output of a signal between the host personal computer and the printer at the time a signal for instructing start of communication has been received. In case an interrupt has occurred while the printer 1 is executing printing actions (in case a signal for instructing start of communication has been received), it has been arranged that a busy signal that is output from the CPU of the printer 1 to the host personal computer 3 is compulsorily made high. When the host personal computer 3 has received the high busy signal from the printer 1 and the host personal computer 3 has output a signal to the printer 1 for instructing start of communication, a signal corresponding to the busy signal is output to the printer 1 so that the printer 1 performs normal actions in correspondence to this signal. In case the host personal computer 3 has not intentionally output the signal for instructing start of communication, that is, an incorrect signal for instructing start of communication has been output to the printer 1 from the Zip drive 2, the host personal computer 3 ignores the busy signal and gives no response to the printer 1 so that the printer 1 considers the signal for instructing start of communication as invalid so that the condition of printing actions that are being performed at that time is maintained.

By the above arrangement for processing signals, even though a signal that is identical to the signal for instructing start of communication (Event 1 signal of IEEE 1284 standard) should be output from the Zip drive 2 to the printer 1 at the time the host personal computer 3 has actuated the Zip drive 2 while printing operations are being executed by the printer 1 upon instructions from the host personal computer 3, it can be eliminated that the printer 1 performs processes for starting communication based on this signal and printing actions that are being performed can be maintained.

It should be noted that the present invention is not limited to the above embodiment and may be variously modified. For example, while the signal that is output from the host personal computer 3 to the printer 1 is an Event 1 signal of IEEE 1284 standard in the above embodiment, the invention is not limited to this signal but the present invention is also applicable to other types of signals. The set time for the timer at the time of detecting whether the signal that has been received by the printer 1 is correct or not is not limited to 2 ms as indicated in the above embodiment but may be suitably changed, and the number of times for confirming signals by the ASIC during counting of the timer is not limited, either.

As explained so far, according to the present invention, it can be accurately detected upon receipt of a signal for instructing start of communication when printing actions are being executed whether this signal is a signal that has been correctly sent from the data processing device or not. With this arrangement, it can be prevented that printing actions are terminated owing to incorrect signals that have been leaked out from an external recording device to a printer device, and it can be eliminated for a situation in which printing data that are lost in the course of printing.

Further, by employing a second control means for detecting signals, signals can be detected at shorter sampling cycles than compared to a case in which signals are detected by the control means so that it can be more accurately detected whether the received signal is a signal for instructing start of communication or not, and it can be reliably prevented for malfunctions caused through receipt of incorrect signals.

Also, by performing correct signal detection by the second control means and by performing signal detection by the second control means at short sampling cycles, malfunctions caused through receipt of incorrect signals can be reliably prevented.

What is claimed is:

1. A printer device that is connected to a data processing device via an external recording device through parallel interfaces provided with specified control signal cables, comprising:

a control means for controlling the printer device;

wherein the control means notifies the data processing device that the printer device is in a busy condition in case the printer device receives a signal instructing start of communication when printing actions are being executed upon instructions from the data processing device, and invalidates the signal instructing start of communication in case no response related to said notification is received from the data processing device.

2. A printer device that is connected to a data processing device via an external recording device through parallel interfaces provided with specified control signal cables, comprising:

a control means for governing control of the printer device; and, a second control means for supporting controlling actions performed by the control means;

wherein the second control means performs detection of signals that have been received from the data processing device at specified sampling cycles, and allows an interrupt in case it is detected that this signal is a signal for instruct start of communication; and, wherein the control means notifies the data processing device that the printer device is in a busy condition in case the interrupt is allowed when printing actions are being executed upon instructions of the data processing device, and invalidates the signal instructing start of communication in case no response related to this notification is received from the data processing device.

3. The printer device according to claim 2, wherein the data processing device is a host computer, the external recording device is a Zip drive, the control means is a CPU, and the second control means is an ASIC.

4. The printer device according to claim 2, wherein the specified sampling cycle for detecting signals by the second control means is shorter than that of the control means.

* * * * *